(12) United States Patent
Maruyama (10) Patent No.: US 11,789,340 B2
(45) Date of Patent: Oct. 17, 2023

(54) CONTROL APPARATUS, LENS APPARATUS, CONTROL METHOD, AND STORAGE MEDIUM

(71) Applicant: CANON KABUSHIKI KAISHA, Tokyo (JP)

(72) Inventor: Satoshi Maruyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/903,428

(22) Filed: Sep. 6, 2022

(65) Prior Publication Data

US 2023/0102939 A1 Mar. 30, 2023

(30) Foreign Application Priority Data

Sep. 28, 2021 (JP) .................................. 2021-158147

(51) Int. Cl.
G03B 13/36 (2021.01)
H04N 23/67 (2023.01)

(52) U.S. Cl.
CPC ............. *G03B 13/36* (2013.01); *H04N 23/67* (2023.01)

(58) Field of Classification Search
CPC ................................ H04N 23/67; G03B 13/67
USPC ....................................................... 348/345
See application file for complete search history.

(56) References Cited

U.S. PATENT DOCUMENTS 9,739,973 B2    8/2017   Kishida et al.
2014/0320736 A1*  10/2014  Tomita ................. H04N 23/672
                                                        348/353
2021/0124147 A1   4/2021   Maruyama

FOREIGN PATENT DOCUMENTS

JP          5688545 B2      3/2015
JP         2021067802 A     4/2021

* cited by examiner

*Primary Examiner* — Joel W Fosselman
(74) *Attorney, Agent, or Firm* — ROSSI, KIMMS & McDOWELL LLP (57) ABSTRACT

A control apparatus for a lens apparatus to be detachably attached to an image pickup apparatus and including first and second focus lenses that are independently movable during focusing includes an acquisition unit for acquiring optical data that include information on a focus sensitivity of the first focus lens, and information on a focus sensitivity of the second focus lens, and a calculation unit for calculating a moving speed of the first focus lens using a target image plane speed acquired from the image pickup apparatus, target positions of the first and second focus lenses, current positions of the first and second focus lenses, and the optical data, and to calculate a moving speed of the second focus lens using the target positions of the first and second focus lenses, and the current positions of the first and second focus lenses.

9 Claims, 11 Drawing Sheets

FOCUS SENSITIVITY TABLE OF FIRST FOCUS LENS (ZOOM 0)

| ZONE NO. | | ZONE 01 | ZONE 02 | ZONE 03 | ZONE 04 | ZONE 05 | |
|---|---|---|---|---|---|---|---|
| FOCUS SENSITIVITY | | Sm01 | Sm02 | Sm03 | Sm04 | Sm05 | |
| BOUNDARY POSITION | Pm01 | Pm02 | Pm03 | Pm04 | Pm05 | Pm06 |

FOCUS SENSITIVITY TABLE OF FIRST FOCUS LENS (ZOOM 1)

| ZONE NO. | | ZONE 11 | ZONE 12 | ZONE 13 | ZONE14 | ZONE15 | |
|---|---|---|---|---|---|---|---|
| FOCUS SENSITIVITY | | Sm11 | Sm12 | Sm13 | Sm14 | Sm15 | |
| BOUNDARY POSITION | Pm11 | Pm12 | Pm13 | Pm14 | Pm15 | Pm16 |

FOCUS SENSITIVITY TABLE OF SECOND FOCUS LENS (ZOOM 0)

| ZONE NO. | | ZONE 01 | ZONE 02 | ZONE 03 | ZONE 04 | ZONE 05 | |
|---|---|---|---|---|---|---|---|
| FOCUS SENSITIVITY | | Ss01 | Ss02 | Ss03 | Ss04 | Ss05 | |
| BOUNDARY POSITION | Ps01 | Ps02 | Ps03 | Ps04 | Ps05 | Ps06 |

FOCUS SENSITIVITY TABLE OF SECOND FOCUS LENS (ZOOM 1)

| ZONE NO. | | ZONE 11 | ZONE 12 | ZONE 13 | ZONE 14 | ZONE 15 | |
|---|---|---|---|---|---|---|---|
| FOCUS SENSITIVITY | | Ss11 | Ss12 | Ss13 | Ss14 | Ss15 | |
| BOUNDARY POSITION | Ps11 | Ps12 | Ps13 | Ps14 | Ps15 | Ps16 |

FOCUS SENSITIVITY TABLE OF FIRST FOCUS LENS

| ZONE NO. | | ZONE 1 | ZONE 2 | ZONE 3 | ZONE 4 | ZONE 5 | |
|---|---|---|---|---|---|---|---|
| FOCUS SENSITIVITY | | Sm1 | Sm2 | Sm3 | Sm4 | Sm5 | |
| BOUNDARY POSITION | Pm1 | | Pm2 | Pm3 | Pm4 | Pm5 | Pm6 |

FOCUS SENSITIVITY TABLE OF SECOND FOCUS LENS

| ZONE NO. | | ZONE 1 | ZONE 2 | ZONE 3 | ZONE 4 | ZONE 5 | |
|---|---|---|---|---|---|---|---|
| FOCUS SENSITIVITY | | Ss1 | Ss2 | Ss3 | Ss4 | Ss5 | |
| BOUNDARY POSITION | Ps1 | | Ps2 | Ps3 | Ps4 | Ps5 | Ps6 |

FOCUS SENSITIVITY TABLE OF FIRST FOCUS LENS (ZOOM 0)

| ZONE NO. | | ZONE 01 | ZONE 02 | ZONE 03 | ZONE 04 | ZONE 05 | |
|---|---|---|---|---|---|---|---|
| FOCUS SENSITIVITY | | Sm01 | Sm02 | Sm03 | Sm04 | Sm05 | |
| BOUNDARY POSITION | Pm01 | Pm02 | Pm03 | Pm04 | Pm05 | Pm06 |

FOCUS SENSITIVITY TABLE OF FIRST FOCUS LENS (ZOOM 1)

| ZONE NO. | | ZONE 11 | ZONE 12 | ZONE 13 | ZONE14 | ZONE15 | |
|---|---|---|---|---|---|---|---|
| FOCUS SENSITIVITY | | Sm11 | Sm12 | Sm13 | Sm14 | Sm15 | |
| BOUNDARY POSITION | Pm11 | Pm12 | Pm13 | Pm14 | Pm15 | Pm16 |

FOCUS SENSITIVITY TABLE OF SECOND FOCUS LENS (ZOOM 0)

| ZONE NO. | | ZONE 01 | ZONE 02 | ZONE 03 | ZONE 04 | ZONE 05 | |
|---|---|---|---|---|---|---|---|
| FOCUS SENSITIVITY | | Ss01 | Ss02 | Ss03 | Ss04 | Ss05 | |
| BOUNDARY POSITION | Ps01 | Ps02 | Ps03 | Ps04 | Ps05 | Ps06 |

FOCUS SENSITIVITY TABLE OF SECOND FOCUS LENS (ZOOM 1)

| ZONE NO. | | ZONE 11 | ZONE 12 | ZONE 13 | ZONE 14 | ZONE 15 | |
|---|---|---|---|---|---|---|---|
| FOCUS SENSITIVITY | | Ss11 | Ss12 | Ss13 | Ss14 | Ss15 | |
| BOUNDARY POSITION | Ps11 | Ps12 | Ps13 | Ps14 | Ps15 | Ps16 |

CONTROL APPARATUS, LENS APPARATUS, CONTROL METHOD, AND STORAGE MEDIUM

BACKGROUND

Technical Field

The disclosure relates to a control apparatus for controlling a lens apparatus to be attached to an image pickup apparatus.

Description of the Related Art

There has conventionally been known a lens apparatus that includes a main lens unit for providing focusing and an auxiliary lens unit for correcting aberrations in order to reduce the shortest imaging distance. Japanese Patent Laid-Open No. 2021-67802 discloses a configuration that moves the main lens unit and the auxiliary lens within certain error ranges by correcting a driving trajectory of the auxiliary lens unit based on data representing a relationship among positions of the main lens unit and the auxiliary lens unit, their focal lengths, and an object distance. Japanese Patent No. 5688545 discloses a configuration that makes an actuator move at a constant speed until an in-focus position is determined in order to suppress driving noise of the actuator.

However, the configuration disclosed in Japanese Patent Laid-Open No. 2021-67802 needs to retain a large amount of data and to perform frequent communications. In addition, since the actuator is frequently operated, driving noise of the actuator becomes louder.

The configuration disclosed in Japanese Patent No. 5688545 premises contrast autofocus (AF), and accords the position of the main lens unit and the position of the auxiliary lens unit with each other near the in-focus position. However, phase difference AF performs focus detection even during search driving, and thus if a positional shift between the main lens unit and the auxiliary lens unit increases, an error in the focus detecting accuracy may occur due to the aberrational influence. In addition, if the positional shift between the main lens unit and the auxiliary lens unit increases, the image quality during recording of a moving image deteriorates due to the aberrational influence.

SUMMARY

The disclosure provides a control apparatus that can reduce a positional shift between two focus lenses while suppressing driving noise during driving of each focus lens.

A control apparatus according to one aspect of the disclosure is configured to control a lens apparatus that is attachable to and detachable from an image pickup apparatus and includes a first focus lens and a second focus lens that are independently movable during focusing. The control apparatus includes at least one processor, and a memory coupled to the at least one processor, the memory having instructions that, when executed by the processor, performs operations as an acquisition unit configured to acquire optical data that include information on a focus sensitivity of the first focus lens, and information on a focus sensitivity of the second focus lens, and a calculation unit configured to calculate a moving speed of the first focus lens using a target image plane speed acquired from the image pickup apparatus, target positions of the first focus lens and the second focus lens, current positions of the first focus lens and the second focus lens, and the optical data, and to calculate a moving speed of the second focus lens using the target positions of the first focus lens and the second focus lens, and the current positions of the first focus lens and the second focus lens.

A lens apparatus that includes the above control apparatus also constitutes another aspect of the disclosure. A control method corresponding to the control apparatus and a storage medium storing a program that causes a computer of a lens apparatus to execute the above control method also constitute another aspect of the disclosure.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure. Corresponding elements in respective figures will be designated by the same reference numerals, and a duplicate description thereof will be omitted.

First Embodiment

Figure 1A:
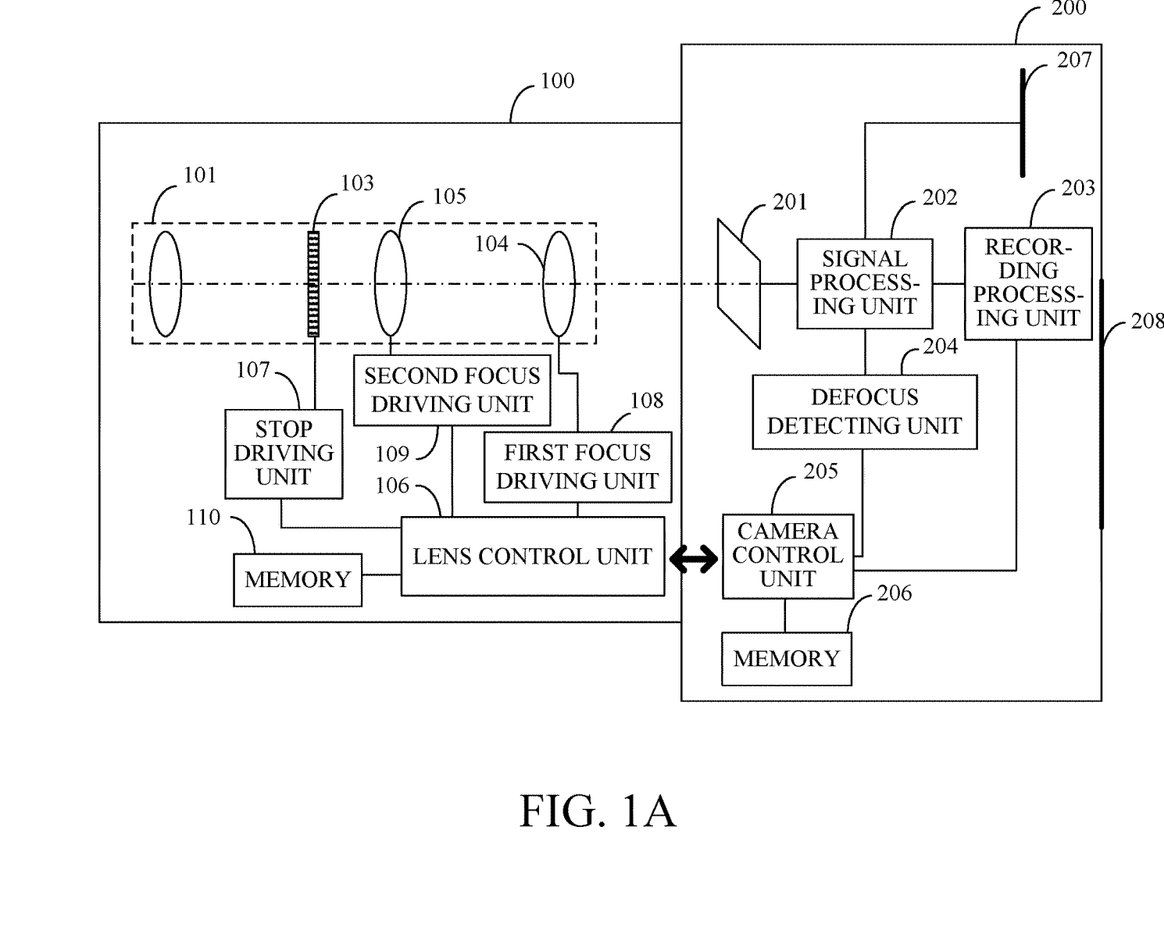
FIGS. 1A and 1B schematically illustrate a camera system according to a first embodiment.

FIG. 1A schematically illustrates a camera system according to this embodiment. The camera system includes a lens apparatus 100 and a camera body (image pickup apparatus) 200 to which the lens apparatus 100 is to be detachably attached. The lens apparatus 100 and the camera body 200 are mechanically and electrically connectable to each other via an unillustrated mount, and power supply and mutual communication between the lens apparatus 100 and the camera body 200 are performed via terminals provided on the mount.

The lens apparatus 100 includes an optical system 101, a lens control unit (control apparatus) 106, a stop driving unit 107, a first focus driving unit 108, a second focus driving unit 109, and a memory 110. The optical system 101 forms an optical image of an object on an image sensor 201 in the camera body 200. The optical system 101 includes an aperture stop (diaphragm) 103, a first focus lens 104, and a second focus lens 105. The aperture stop 103 includes unillustrated stop blades, and the stop blades are moved by the stop driving unit 107 via an actuator to adjust a light amount. The first focus lens 104 is moved in an optical axis direction by the first focus driving unit 108 via an actuator to adjust an in-focus state and aberrations. The second focus lens 105 is moved in the optical axis direction by the second focus driving unit 109 via an actuator to adjust the in-focus state and aberrations. The first focus lens 104 and the second focus lens 105 are independently movable during focusing. In this embodiment, each of the first focus driving unit 108 and the second focus driving unit 109 includes a stepping motor as the actuator and a gear transmission mechanism that transmits a rotation of the stepping motor to each focus lens. The position of each focus lens may be feedback-controlled by using a detection signal from a position detecting unit by which the lens control unit 106 detects the position of each focus lens.

Figure 1B:
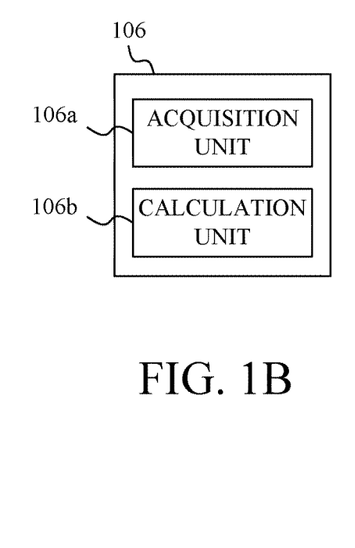

The lens control unit 106 includes a computer (control apparatus) equipped with a Central Processing Unit (CPU), and includes an acquisition unit 106a and a calculation unit 106b as illustrated in FIG. 1B. The lens control unit 106 transmits a driving command value to each of the stop driving unit 107, the first focus driving unit 108, and the second focus driving unit 109 so as to control driving of the aperture stop 103, the first focus lens 104, and the second focus lens 105.

Figure 2:
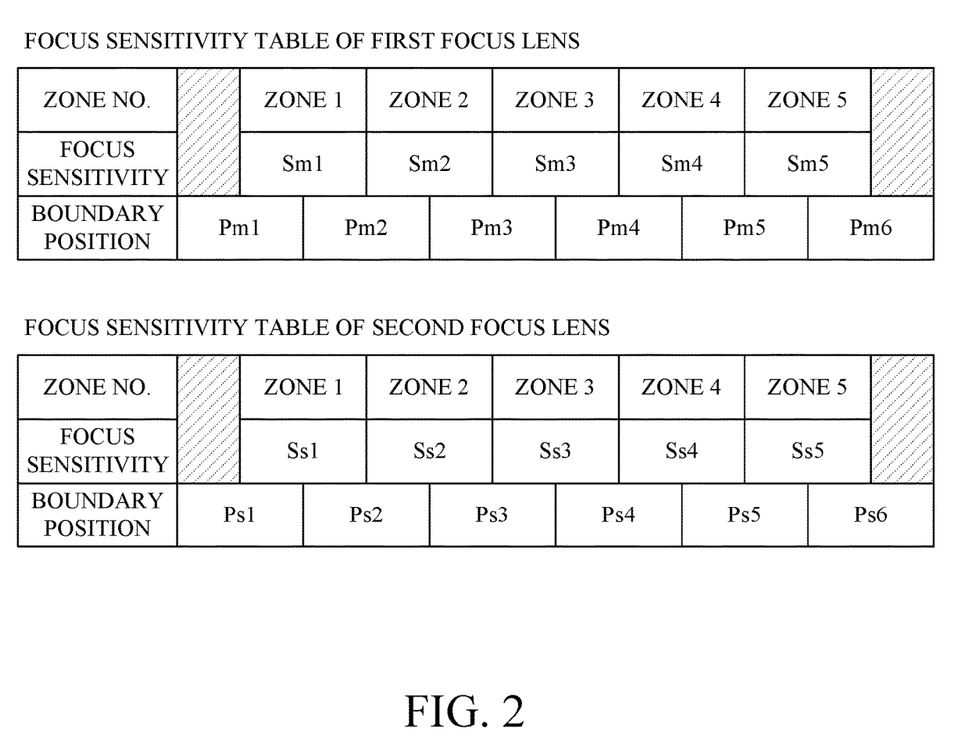
FIG. 2 illustrates a focus sensitivity table according to the first embodiment.

The memory 110 includes a ROM, a RAM, or the like, and stores information (optical data) necessary to drive the aperture stop 103, the first focus lens 104, and the second focus lens 105. FIG. 2 illustrates a focus sensitivity table that includes information on the first focus lens and the focus sensitivity of the first focus lens and information on the second focus lens and the focus sensitivity of the second focus lens, which are included in the optical data. More specifically, the information on the first focus lens 104 and the focus sensitivity of the first focus lens 104 includes information on the plurality of (first) zones according to the position of the first focus lens 104 and the focus sensitivity of the first focus lens 104 for each of the plurality of (first) zones. The information on the second focus lens 105 and the focus sensitivity of the second focus lens 105 includes information on a plurality of (second) zones according to the second focus lens 105 and the focus sensitivity of the second focus lens 105 for each of the plurality of (second) zones. The plurality of (first) zones according to the position of the first focus lens 104 and the plurality of (second) zones according to the position of the second focus lens 105 correspond to each other. The focus sensitivity table also includes a boundary position of each focus lens, which is a zone dividing position. The focus sensitivity is a moving amount of a focus position (image plane position) relative to a moving amount of each focus lens.

The camera body 200 includes the image sensor 201, a signal processing unit 202, a recording processing unit 203, a defocus detecting unit 204, a camera control unit 205, a memory 206, an electronic viewfinder 207, and a display unit 208. The image sensor 201 receives light from the optical system 101, generates an electric signal by photoelectric conversion, and transmits a generated electric signal to the signal processing unit 202. The image sensor 201 includes unillustrated focus detecting pixels in addition to imaging pixels. The signal processing unit 202 converts the electric signal from the image sensor 201 into a digital signal. The signal processing unit 202 performs various image processing such as noise removal and color correction for the digital signal, and transmits image data to the recording processing unit 203. The recording processing unit 203 displays the input image data on the electronic viewfinder 207 and the display unit 208. The defocus detecting unit 204 determines a defocus amount based on a phase difference between signals of the pair of object images acquired by the light incident on the focus detecting pixel in the image sensor 201 via a microlens that divides the pupil, and outputs the determined defocus amount to the camera control unit 205. The camera control unit 205 includes a CPU and is electrically connected to the recording processing unit 203, the defocus detecting unit 204, and the memory 206. The camera control unit 205 reads and executes a program recorded in the memory 206, and communicates information necessary for AF control to the lens control unit 106. The camera control unit 205 controls the camera body 200 in response to an input from a camera operation unit such as an unillustrated imaging switch or various setting switches.

Figure 3A:
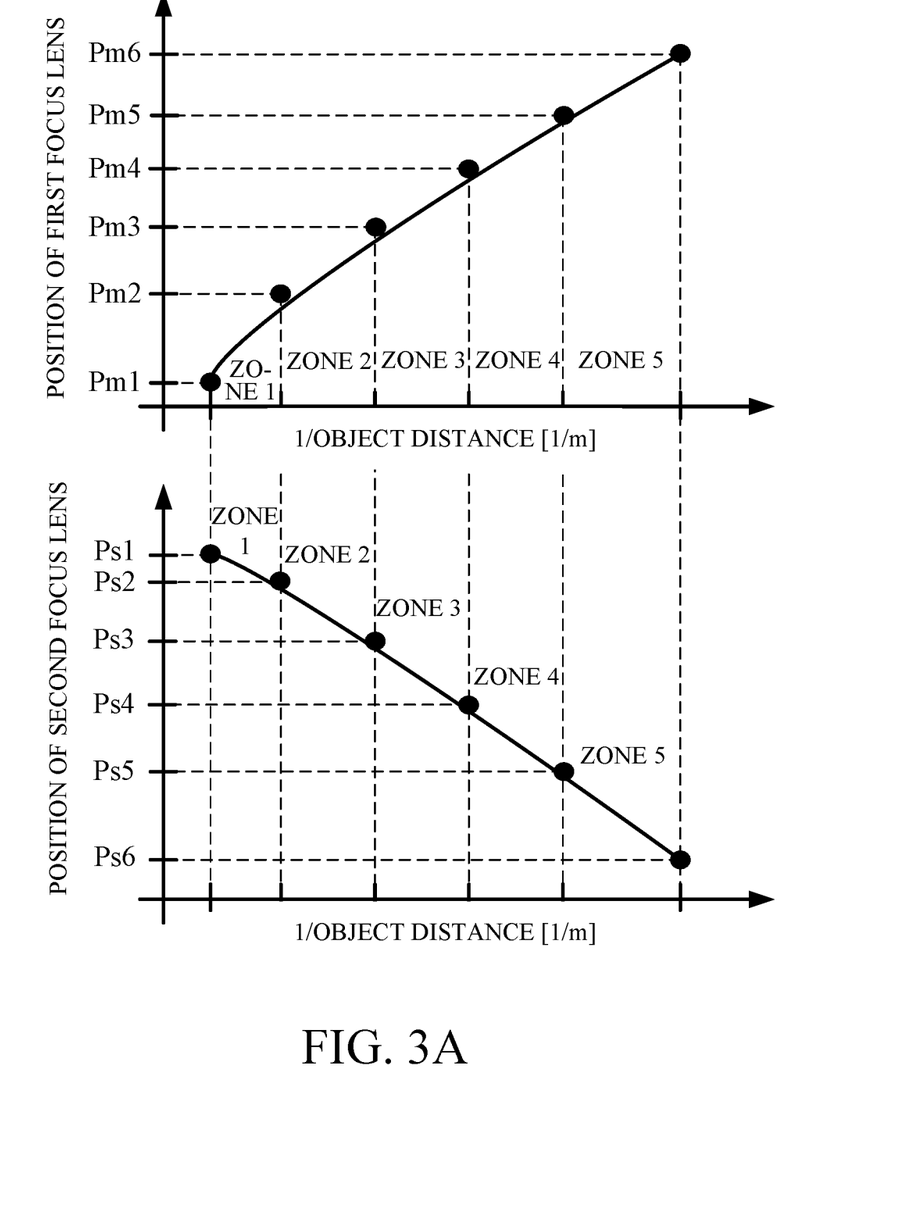
FIGS. 3A and 3B illustrate a relationship between an object distance and a position of a focus lens in the first embodiment.
Figure 3B:
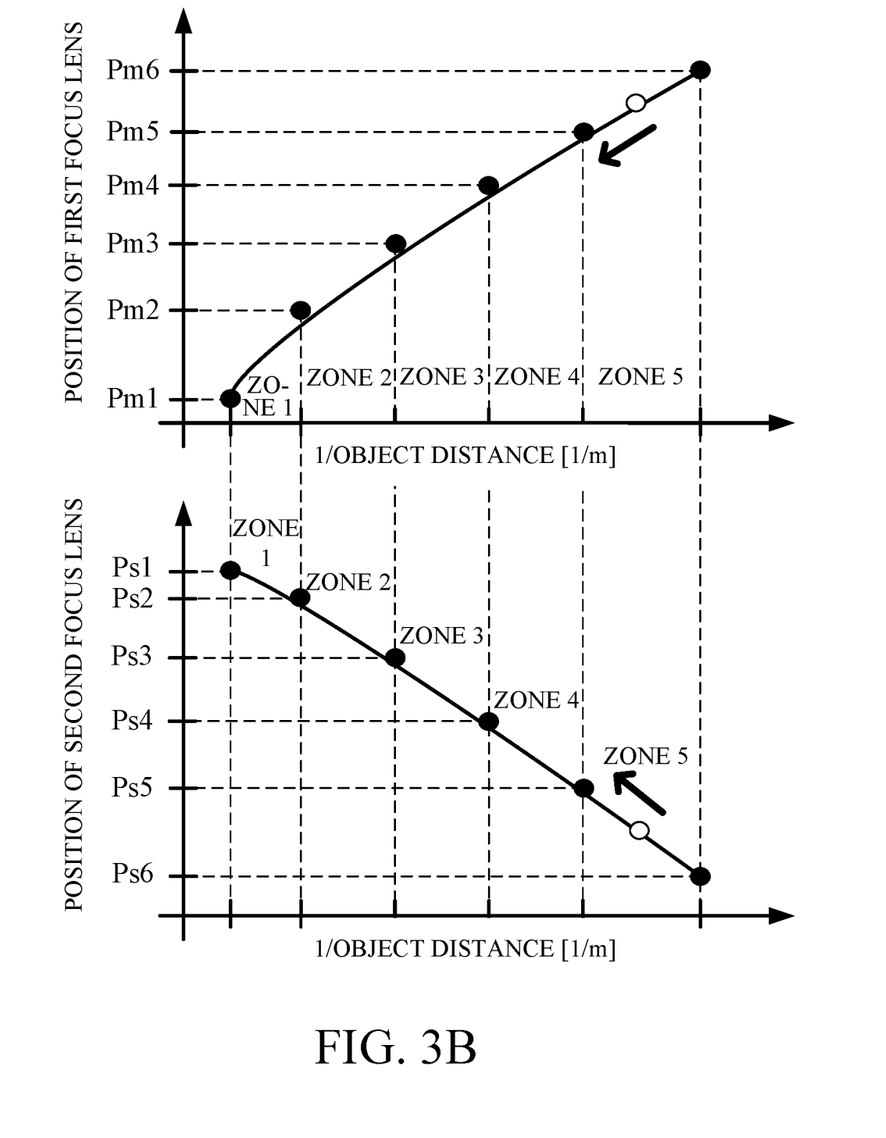

FIGS. 3A and 3B illustrate a relationship between an object distance and a position of each focus lens in this embodiment. This embodiment sets five zones. This embodiment sets the number of zones to 5, but the number of zones is not limited to this example. In this embodiment, the moving speed of each focus lens is calculated by using the focus sensitivity, and thus steeply changes if a difference in the focus sensitivity between adjacent zones is large. Therefore, the number of zones may be set so as to reduce the focus sensitivity difference.

A description will now be given of the operation of the lens control unit 106 in a case where a command to move each focus lens is transmitted from the camera body 200 to the lens apparatus 100. A description will now be given of a case where the lens control unit 106 receives a command to move the first focus lens 104 and the second focus lens 105 from close (short-distance) positions $P_{m6}$ and $P_{s6}$ in FIG. 3A to infinity positions $P_{m1}$ and $P_{s1}$, respectively. Now assume that this command includes information on a target image plane speed V [mm/sec].

Upon receiving the command from the camera body 200, the lens control unit 106 first calculates the moving amounts of the first focus lens 104 and the second focus lens 105. The moving amounts of the first focus lens 104 and the second focus lens 105 are calculated as $P_{m1}$-$P_{m6}$ and $P_{s1}$-$P_{s6}$, respectively. This embodiment sets the boundary position defined in the focus sensitivity table to the moving start position and the target position of the focus lens for simpler explanation, but may start moving the focus lens from a position in the zone as illustrated by a white dot in FIG. 3B.

Next, the lens control unit 106 calculates the moving speed of each focus lens. As illustrated in FIGS. 3A and 3B, since the zone corresponds to the object distance, the first focus lens 104 and the second focus lens 105 belong to the same zone in principle. In a case where one of the first focus lens 104 and the second focus lens 105 is located at the boundary position, the other is also located at the boundary position of the same zone so as to secure the synchronism of the two focus lenses. For example, in a case where the first focus lens 104 is moved from the close position $P_{m6}$ to a position $P_{m5}$, it is necessary to move the second focus lens 105 from the close position $P_{s6}$, which is the boundary position of the same zone, to a position $P_{s5}$ in the same time period. An image plane moving amount caused by the movement of the first focus lens 104 in Zone 5 is calculated as $S_{m5}(P_{m5}$-$P_{m6})$ based on the focus sensitivity $S_{m5}$ of the first focus lens 104 and the moving amount of the first focus lens 104. Similarly, an image plane moving amount caused by the movement of the second focus lens 105 in Zone 5 is calculated as $S_{s5}(P_{s5}-P_{s6})$. Hence, an image plane moving amount x caused by the movements of the first focus lens 104 and the second focus lens 105 in Zone 5 is expressed by the following expression (1):

$$x = S_{m5}(P_{m5}-P_{m6}) + S_{s5}(P_{s5}-P_{s6}) \tag{1}$$

The expression (1) is expressed by the following expression (2) when the expression (1) is deformed based on the moving amount of the first focus lens 104.

$$x = \left\{ S_{m5} + S_{s5}\left(\frac{P_{s5}-P_{s6}}{P_{m5}-P_{m6}}\right) \right\} (P_{m5}-P_{m6}) \tag{2}$$

Underlined part of the expression (2) is expressed only by the variables defined by the focus sensitivity table, and means that the image plane moving amount can be calculated in which the moving amount of the second focus lens 105 is considered when the first focus lens 104 is moved. When the relationship of the expression (2) is considered, the target image plane speed V acquired from the camera body 200 is expressed by the following expression (3), where $V_m$ is a moving speed of the first focus lens 104.

$$V = \left\{ S_{m5} + S_{s5}\left(\frac{P_{s5}-P_{s6}}{P_{m5}-P_{m6}}\right) \right\} V_m \tag{3}$$

The moving speed $V_m$ of the first focus lens 104 can be calculated based on the expression (3). While this embodiment premises that each focus lens is moved in Zone 5, the moving speed of the first focus lens 104 can be calculated in another zone according to the focus sensitivity and the boundary position of that zone.

After the moving speed of the first focus lens 104 is calculated, the lens control unit 106 calculates the moving speed $V_s$ of the second focus lens 105 using the following expression (4) based on a moving amount ratio between these focus lenses.

$$V_s = \left(\frac{P_{s5}-P_{s6}}{P_{m5}-P_{m5}}\right) V_m \tag{4}$$

The lens control unit 106 monitors the current position of each focus lens until each focus lens reaches the target position, and updates the moving speed of each focus lens when the zone is changed.

Figure 4:
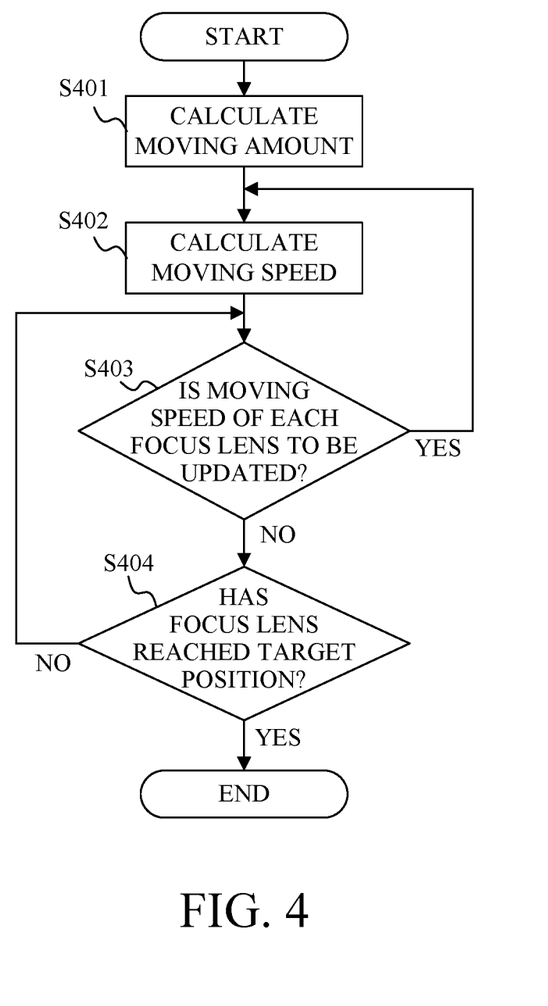
FIG. 4 is a flowchart illustrating processing of a lens control unit according to the first embodiment in a case where the lens control unit receives a command to move the focus lens from a camera body.

FIG. 4 is a flowchart illustrating processing by the lens control unit 106 in a case where the lens control unit 106 receives a command to move each focus lens from the camera body 200 in this embodiment.

In step S401, the lens control unit 106 calculates the moving amounts of the first focus lens 104 and the second focus lens 105 in response to the command from the camera body 200.

In step S402, the lens control unit 106 (calculation unit 106b) calculates the moving speed of each focus lens using the expressions (3) and (4). It is assumed that the acquisition unit 106a has acquired the optical data from the memory 110 before calculating the moving speed. Strictly speaking, an acceleration time is required to accelerate the stepping motor of each focus driving unit to a predetermined speed. For example, in a case where the acceleration of the second focus lens 105 is smaller than that of the first focus lens 104, it is conceivable that the second focus lens 105 is moved later than the first focus lens 104. In this case, it is considered that each focus lens is moved by constant speed motion and constant acceleration motion, and a delay caused by the difference in acceleration is calculated, and the speed of the second focus lens 105 may be corrected to be higher so that the delay can be eliminated at the boundary position of the zone. In a case where a ratio of the acceleration time to the moving time of the second focus lens 105 is large, the above delay cannot be reduced even if the speed of the second focus lens 105 is corrected to be higher. In that case, the speed of the first focus lens 104 may be corrected to be lower. The first focus lens 104 and the second focus lens 105 start moving at the moving speed calculated in this step.

In step S403, the lens control unit 106 determines whether to update the moving speed of each focus lens. If it is determined that the moving speed is to be updated, the flow returns to step S502, and otherwise, the flow proceeds to step S504.

As described above, the focus sensitivity changes according to the zone. Therefore, in a case where each focus lens is moved to a different zone, it is necessary to change its moving speed at a timing when it is moved to the different zone, that is, at a timing when the focus lens crosses the boundary position. The case where it is determined that the moving speed is to be updated in step S403 is a case where it is determined that at least one of the two focus lenses crosses the boundary position. In a case where two focus lenses cross the boundary positions at almost the same time, the lens control unit 106 may calculate the moving speed of each focus lens using the expressions (3) and (4). However, as described above, the synchronism of the two focus lenses may not be secured depending on the acceleration condition of each focus lens and the like. The lens control unit 106 corrects the moving speed of at least one of the two focus lenses even if the synchronism of the two focus lenses is not secured when that focus lens crosses the boundary position. For example, in a case where an error (delay or distance on an optical axis) Δp between the position of the second focus lens 105 and a boundary position Po (which is a position of the second focus lens 105 corresponding to the boundary position $P_{m4}$) when the first focus lens 104 crosses (or is moved to) a boundary position $P_{m4}$ (predetermined position), the lens control unit 106 can correct the moving speed using the following expression (5):

$$V_s = \left(\frac{P_{s4}-P_{s5}+\Delta_p}{P_{m5}-P_{m5}}\right) V_m \tag{5}$$

By making higher the moving speed of the second focus lens 105 using the expression (5), the error between the positions of the two focus lenses in Zone 4 can be reduced. On the other hand, in a case where the second focus lens 105 crosses the boundary position before the first focus lens 104, the sign of the error Δp in the expression (5) may be reversed.

Figure 5:
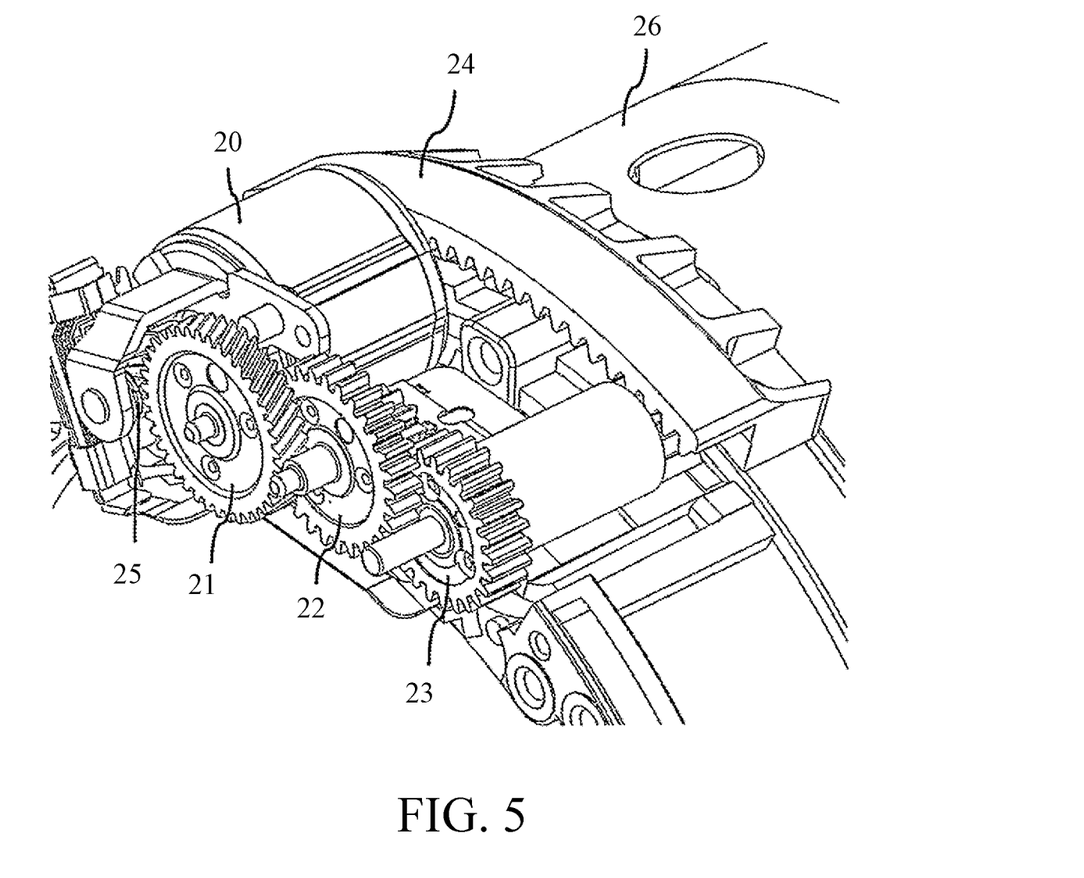
FIG. 5 is a configuration diagram of a second focus driving unit according to the first embodiment.

FIG. 5 is a configuration diagram of the second focus driving unit 109 according to this embodiment. In this embodiment, the second focus lens 105 is moved by a rotation of a cam ring 26 relative to the stepping motor 20 via the transmission mechanism using the gears 21, 22, 23, 24, and 25.

Figure 6A:
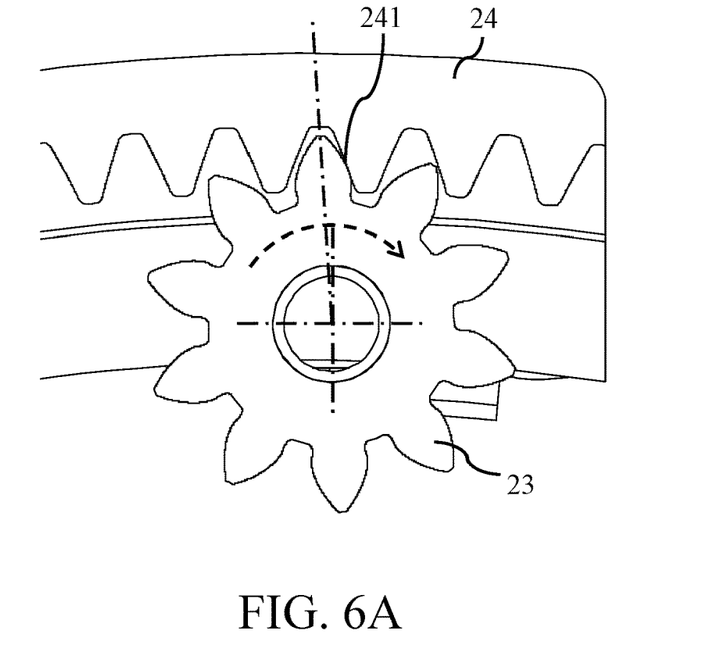
FIGS. 6A and 6B explain the backlash of gears.
Figure 6B:
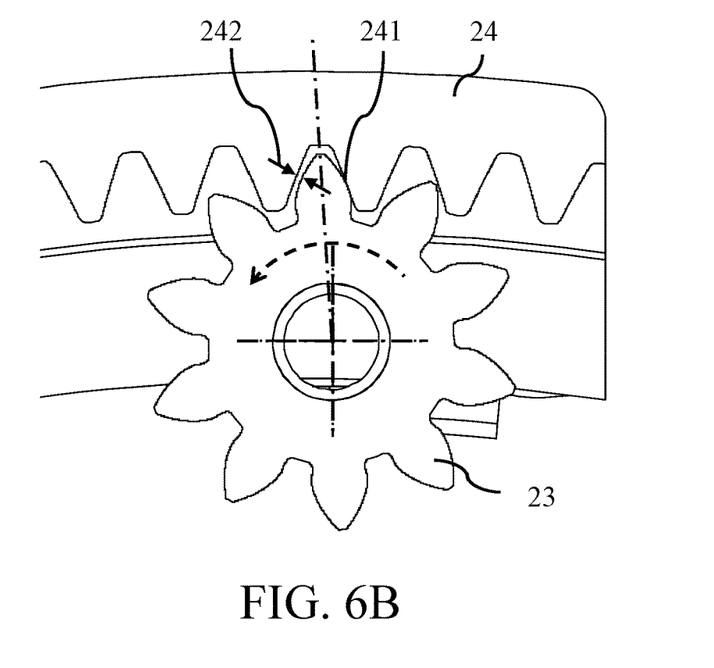

FIGS. 6A and 6B explain the backlash (idleness) of the gears and illustrate the engagement state of the gears 23 and 24. FIG. 6A illustrates the engagement state of the gears 23 and 24 in a case where the gear 23 is rotated in a clockwise (CW) direction. In FIG. 6A, the gears 23 and 24 transmit the force via a contact point 262. FIG. 6B illustrates the engagement state of the gears 23 and 24 in a case where the gear 23 changes the rotation direction from the CW direction to a counterclockwise (CCW) direction (where the moving direction of the second focus lens 105 is reversed from the infinity direction to the close direction). There is a gap 242 in the transmission mechanism using the gears. Therefore, even if the stepping motor 20 operates and the gear 23 is rotated in the CCW direction, the second focus lens 105 is not moved until the gap 242 is filled and the gears 23 and 24 come into contact with each other. Accordingly, this embodiment corrects the moving amount of the second focus lens 105 is corrected so as to additionally operate the stepping motor 20 on the premise that the second focus lens 105 is not moved due to the gap 242.

The gaps formed in the first focus driving unit 108 and the second focus driving unit 109 are not always the same. The first focus driving unit 108 and the second focus driving unit 109 may have different structures. Even in that case, the moving speed of the second focus lens 105 may be calculated by inputting a correction amount based on the gap formed in each focus driving unit into the error Δp in the expression (5). Thereby, a positional shift between the first focus lens 104 and the second focus lens 105 can be reduced.

In step S504, the lens control unit 106 determines whether or not each focus lens has reached the target position. If it is determined that each focus lens has reached the target position, this flow ends (movement of each focus lens is stopped), and if it is determined that each focus lens has not yet reached the target position, the flow returns to step S503.

As described above, the configuration according to this embodiment can suppress noise generation by reducing the changing times of the moving speeds of the first focus lens 104 and the second focus lens 105. In addition, this embodiment simultaneously sets the moving speeds of the first focus lens 104 and the second focus lens 105, and thereby secures the synchronism of the two focus lenses.

Second Embodiment

Figure 7:
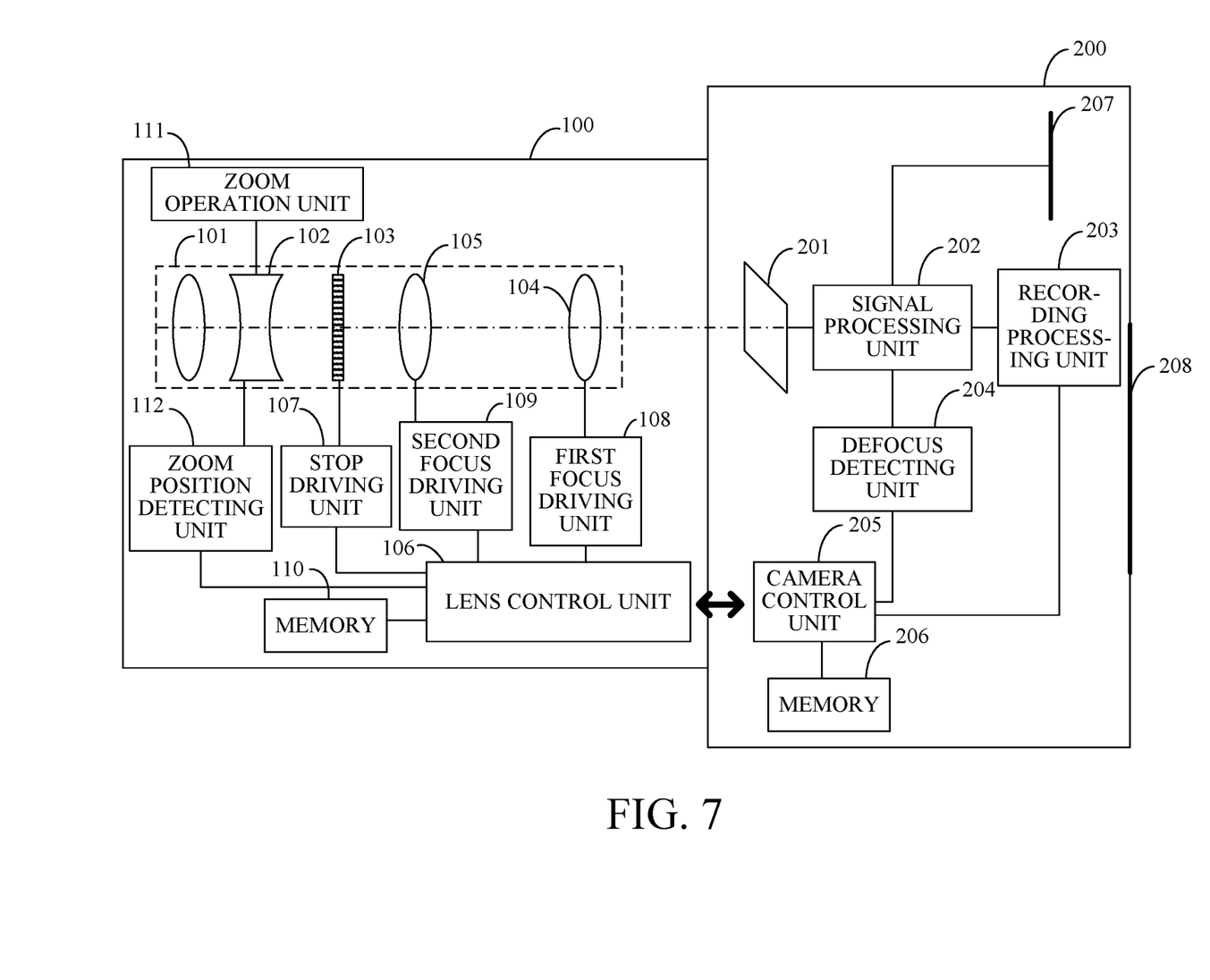
FIG. 7 schematically illustrates a camera system according to a second embodiment.

FIG. 7 schematically illustrates a camera system according to this embodiment. This embodiment will discuss a configuration different from that of the camera system of the first embodiment, and a detailed description of the same configuration will be omitted.

In addition to the configuration of the first embodiment, the lens apparatus 100 includes a magnification varying lens 102, a zoom operation unit 111, and a zoom position detecting unit 112. The magnification varying lens 102 changes a focal length of the lens apparatus 100. The zoom operation unit 111 may manually move the magnification varying lens 102, for example, like a zoom ring, or may electrically move the magnification varying lens 102 using an actuator. The zoom position detecting unit 112 detects the position of the magnification varying lens 102 and transmits the position of the magnification varying lens 102 to the lens control unit 106.

Figure 8:
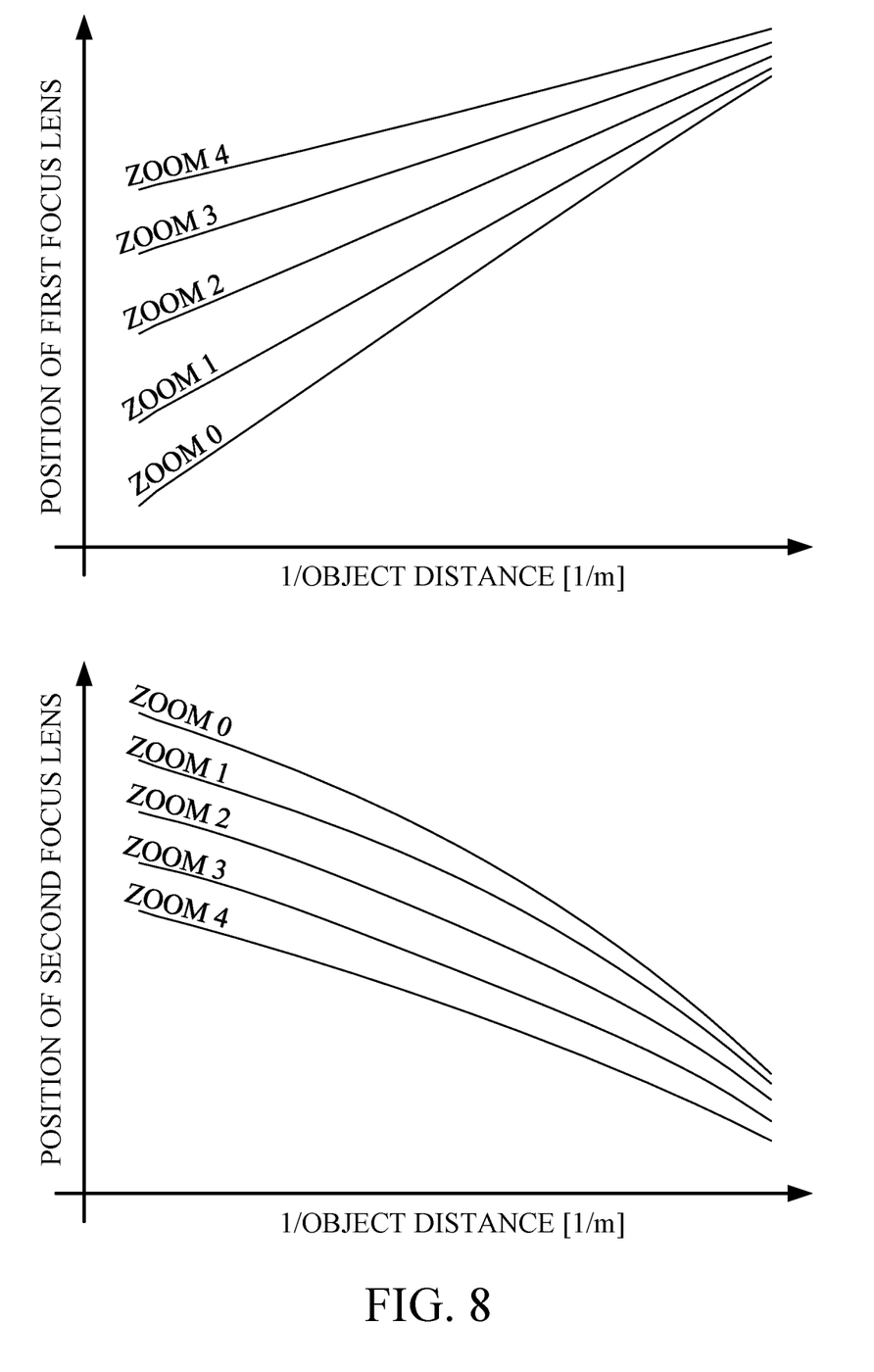
FIG. 8 illustrates a relationship between an object distance and a position of a focus lens for each zoom state in the second embodiment.

FIG. 8 illustrates a relationship between the object distance and the position of the focus lens for each zoom state (focal length) in the second embodiment. FIG. 8 illustrates a relationship between five zoom states from Zoom 0 to Zoom 4, but the number of zoom states is not limited to this example. Since the positions of the first focus lens 104 and the second focus lens 105 change depending on the zoom state, it is necessary to prepare a focus sensitivity table according to the zoom state.

Figure 9:
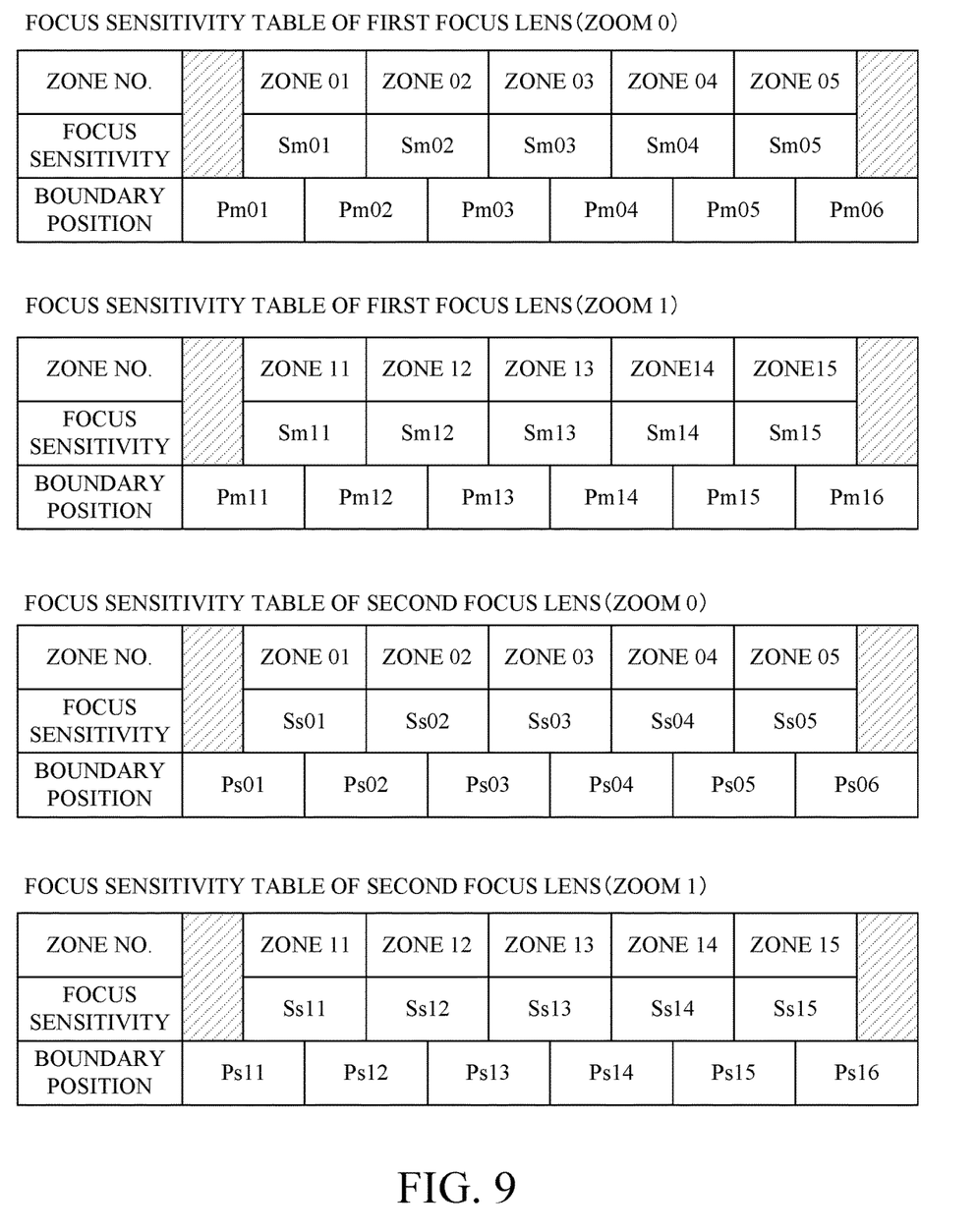
FIG. 9 illustrates focus sensitivity table data according to a second embodiment.
Figure 10:
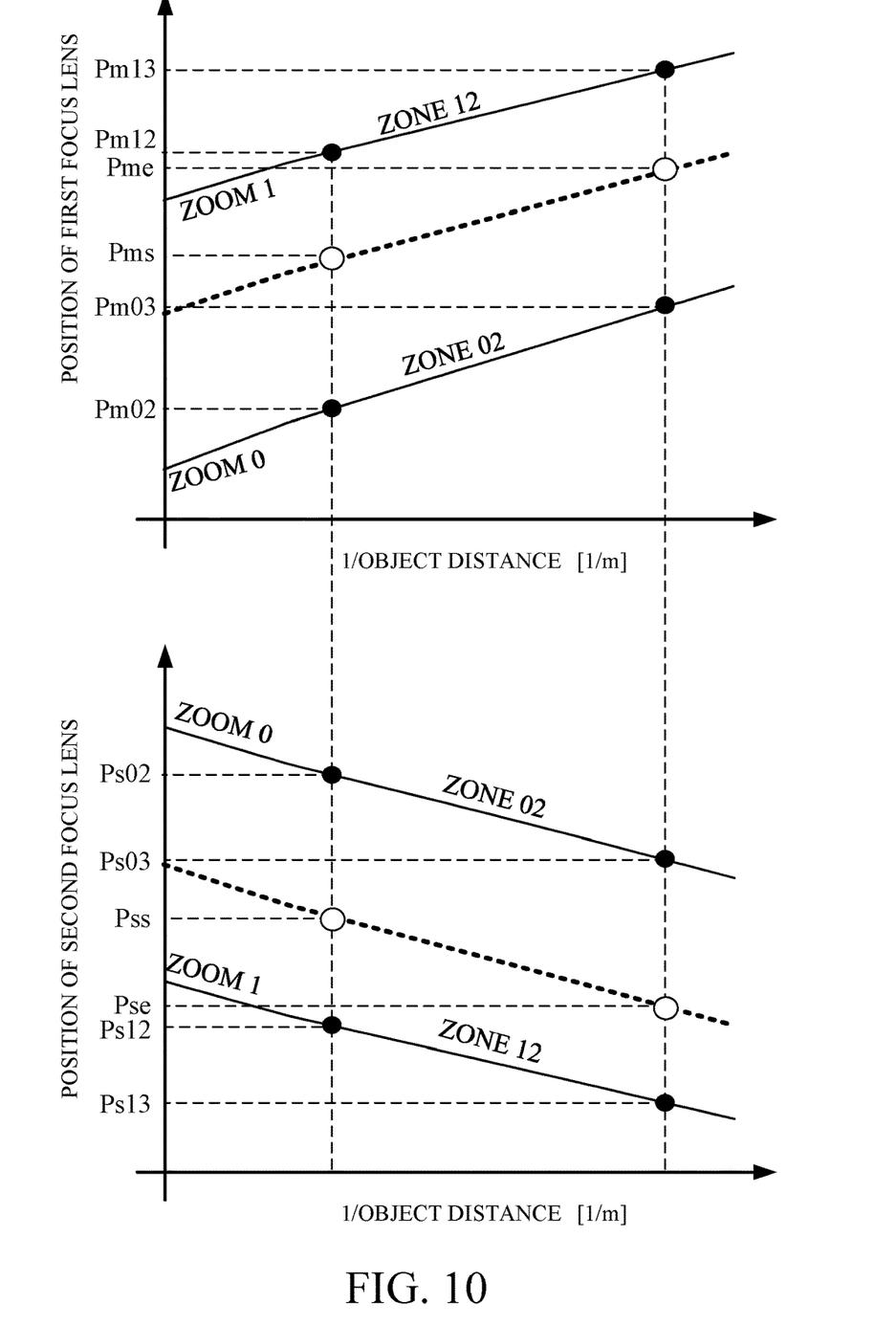
FIG. 10 explains a method of calculating a moving speed of the focus lens according to the second embodiment.

FIG. 9 illustrates a focus sensitivity table according to this embodiment. If the zoom state is a zoom state defined in the focus sensitivity table, the moving speed of each focus lens can be easily calculated by the same method as that of the first embodiment, but as illustrated in FIG. 10, the zoom state may be a zoom state between Zoom 0 and Zoom 1. In that case, the moving speed of each focus lens can be calculated using the same method as that of the first embodiment by data interpolation of the focus sensitivity table, which is linear interpolation or the like using information on the focus sensitivity table of Zoom 0 and Zoom 1. For example, when the first focus lens 104 is located at a position $P_{ms}$, a position $P_{me}$ that satisfies a relationship of $P_{m12}$-$P_{ms}$: $P_{ms}$-$P_{m02}$=$P_{m13}$-$P_{me}$: $P_{me}$-$P_{m03}$ can be calculated as the boundary position.

In the lens apparatus 100 according to this embodiment, each focus lens is electrically moved according to the operation of the zoom operation unit 111. This embodiment can determine the moving conditions of the first focus lens 104 and the second focus lens 105 according to the position of the magnification varying lens 102 detected by the zoom position detecting unit 112. For example, in a case where the zoom state changes from a state of Zoom 0 to a state of Zoom 1 when the first focus lens 104 is located at a position $P_{m02}$, the first focus lens 104 may be moved to a position $P_{m12}$. The second focus lens 105 may be moved from a position $P_{s02}$ to a position $P_{s12}$.

Once the moving amount and the moving speed of the first focus lens 104 are determined according to a state in which the zoom operation unit 111 is operated, the moving amount and the moving speed of the second focus lens 105 are determined by using a moving amount ratio between the focus lenses. For example, in a case where a quick zoom operation is made, it is necessary to quickly move each focus lens in order to suppress defocus.

As described above, the configuration according to this embodiment can provide the same effect as that of the first embodiment, even if the lens apparatus 100 is a zoom lens.

Each embodiment can provide a control apparatus that can reduce a positional shift between two focus lenses while suppressing driving noise during driving of each focus lens.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-158147, filed on Sep. 28, 2021, which is hereby incorporated by reference herein in its entirety.

What is claimed is:

1. A control apparatus configured to control a lens apparatus that is attachable to and detachable from an image pickup apparatus and includes a first focus lens and a second focus lens that are independently movable during focusing, the control apparatus comprising at least one processor, and a memory coupled to the at least one processor, the memory having instructions that, when executed by the processor, performs operations as:
   an acquisition unit configured to acquire optical data that include information on a focus sensitivity of the first focus lens, and information on a focus sensitivity of the second focus lens; and
   a calculation unit configured to calculate a moving speed of the first focus lens using a target image plane speed acquired from the image pickup apparatus, target positions of the first focus lens and the second focus lens, current positions of the first focus lens and the second focus lens, and the optical data, and to calculate a moving speed of the second focus lens using the target positions of the first focus lens and the second focus lens, and the current positions of the first focus lens and the second focus lens.

2. The control apparatus according to claim 1, wherein the information on the focus sensitivity of the first focus lens includes information on a plurality of first zones according to the position of the first focus lens and the focus sensitivity of the first focus lens for each of the plurality of first zones, and
   wherein the information on the focus sensitivity of the second focus lens includes information on a plurality of second zones according to the position of the second focus lens and corresponding to the plurality of first zones, and the focus sensitivity of the second focus lens for each of the plurality of second zones.

3. The control apparatus according to claim 2, wherein the calculation unit calculates the moving speed of the first focus lens and the moving speed of the second focus lens at a timing when at least one of the first focus lens and the second focus lens is moved to a different zone.

4. The control apparatus according to claim 1, wherein the calculation unit calculates the moving speed of the first focus lens and the moving speed of the second focus lens further using an error between the position of the second focus lens when the first focus lens is moved to a predetermined position and a position corresponding to the predetermined position.

5. The control apparatus according to claim 1, wherein the calculation unit calculates the moving speed of the first focus lens and the moving speed of the second focus lens further using acceleration conditions of the first focus lens and the second focus lens.

6. The control apparatus according to claim 1, wherein the lens apparatus further includes:
   a first driving unit configured to drive the first focus lens; and
   a second driving unit configured to drive the second focus lens,
   wherein each of the first driving unit and the second driving unit includes a transmission mechanism using gears, and
   wherein in a case where at least one of moving directions of the first focus lens and the second focus lens is reversed, the calculation unit calculates the moving speed of the first focus lens and the moving speed of the second focus lens further using idleness of the transmission mechanism.

7. A lens apparatus attachable to and detachable from an image pickup apparatus, the lens apparatus comprising:
   an optical system that includes a first focus lens and a second focus lens that are independently movable during focusing; and
   a control apparatus configured to control the lens apparatus,
   wherein the control apparatus includes at least one processor, and a memory coupled to the at least one processor, the memory having instructions that, when executed by the processor, performs operations as:
   an acquisition unit configured to acquire optical data that include information on a focus sensitivity of the first focus lens, and information on a focus sensitivity of the second focus lens; and
   a calculation unit configured to calculate a moving speed of the first focus lens using a target image plane speed acquired from the image pickup apparatus, target positions of the first focus lens and the second focus lens, current positions of the first focus lens and the second focus lens, and the optical data, and to calculate a moving speed of the second focus lens using the target positions of the first focus lens and the second focus lens, and the current positions of the first focus lens and the second focus lens.

8. A control method configured to control a lens apparatus that is attachable to and detachable from an image pickup apparatus and includes a first focus lens and a second focus lens that are independently movable during focusing, the control method comprising the steps of:
   acquiring optical data that include information on a focus sensitivity of the first focus lens, and information on a focus sensitivity of the second focus lens; and
   calculating a moving speed of the first focus lens using a target image plane speed acquired from the image pickup apparatus, target positions of the first focus lens and the second focus lens, current positions of the first focus lens and the second focus lens, and the optical data, and to calculate a moving speed of the second focus lens using the target positions of the first focus lens and the second focus lens, and the current positions of the first focus lens and the second focus lens.

9. A storage medium storing a program that causes a computer of a lens apparatus to execute the control method according to claim 8.

* * * * *